(No Model.) 2 Sheets—Sheet 1.

J. D. RIVELY.
STORAGE BATTERY.

No. 595,208. Patented Dec. 7, 1897.

Witnesses
J. P. Appleman.
A. W. Wilson.

Inventor
John D. Rively.
by Henry C. Evert
Attorney (No Model.) 2 Sheets—Sheet 2.

J. D. RIVELY.
STORAGE BATTERY.

No. 595,208. Patented Dec. 7, 1897.

Witnesses
J. P. Appleman
A. W. Wilson

Inventor
John D. Rively
by Henry C. Evert
Attorney

UNITED STATES PATENT OFFICE.

JOHN D. RIVELY, OF PITTSBURG, PENNSYLVANIA, ASSIGNOR, BY DIRECT AND MESNE ASSIGNMENTS, TO THE ELECTRO-STORAGE COMPANY OF NORTH AMERICA, OF WEST VIRGINIA.

STORAGE BATTERY.

SPECIFICATION forming part of Letters Patent No. 595,208, dated December 7, 1897.

Application filed February 19, 1897. Serial No. 624,104. (No model.)

*To all whom it may concern:*

Be it known that I, JOHN D. RIVELY, a citizen of the United States of America, residing at Pittsburg, in the county of Allegheny and State of Pennsylvania, have invented certain new and useful Improvements in Storage Batteries, of which the following is a specification, reference being had therein to the accompanying drawings.

This invention relates to certain new and useful improvements in storage batteries, and has for its object to construct a battery of this class wherein the electrodes will be insulated from one another and which will afford the greatest practical surface exposure and freer circulation of the current.

A further object of the invention is to provide means whereby the active material or lead oxid and asbestos layers may be permitted to expand and contract and act independently of each other and further prevent the buckling or bursting of the active material.

The invention further consists of a series of plates, composed of lead, aluminium, or other suitable material, arranged horizontally with alternate layers of oxid and asbestos, chemically prepared with acids, chlorids, and the like, and employed to excite the active material, which is attached to a saddle arranged at a suitable point.

A still further object of my invention is to construct a storage battery whereby the efficiency of the same is raised to a perfect result and the life of the battery is prolonged through the arrangement of the different divisions and the electromotive force is increased.

Still further objects of my invention reside in the novel construction, combination, and arrangement of parts, the conducting-plates being thoroughly insulated from each other and the expansion and contraction of the active material or oxid and asbestos being compensated for by the arrangement of construction, as will be more fully described, and particularly pointed out in the claims.

In describing the invention in detail reference is had to the accompanying drawings, forming a part of this specification, and wherein like letters of reference indicate similar parts throughout the several views, in which—

Figure 1:
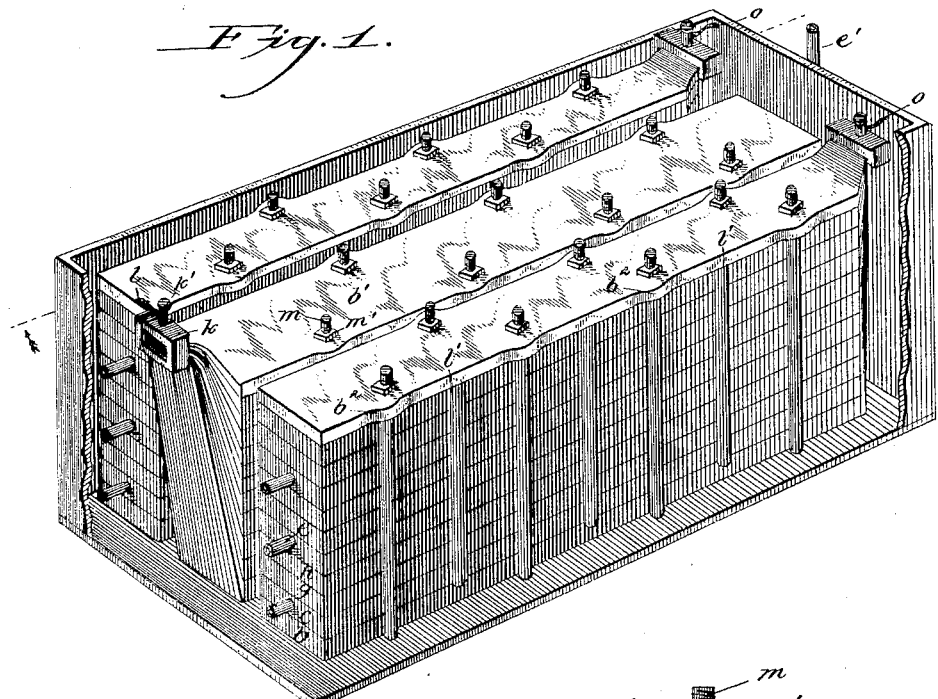
Figure 3:
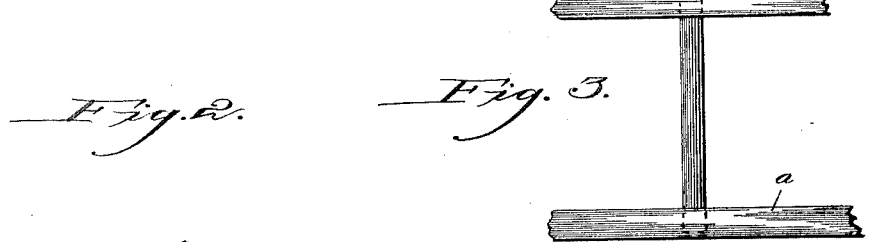
Figure 2:
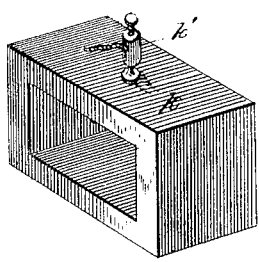
Figure 5:
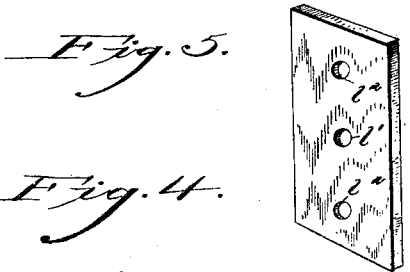
Figure 4:
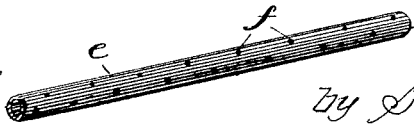
Figure 6:
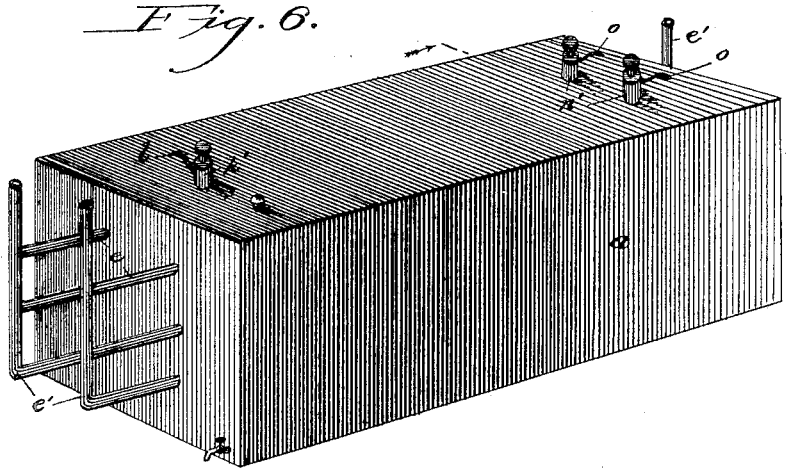
Figure 7:
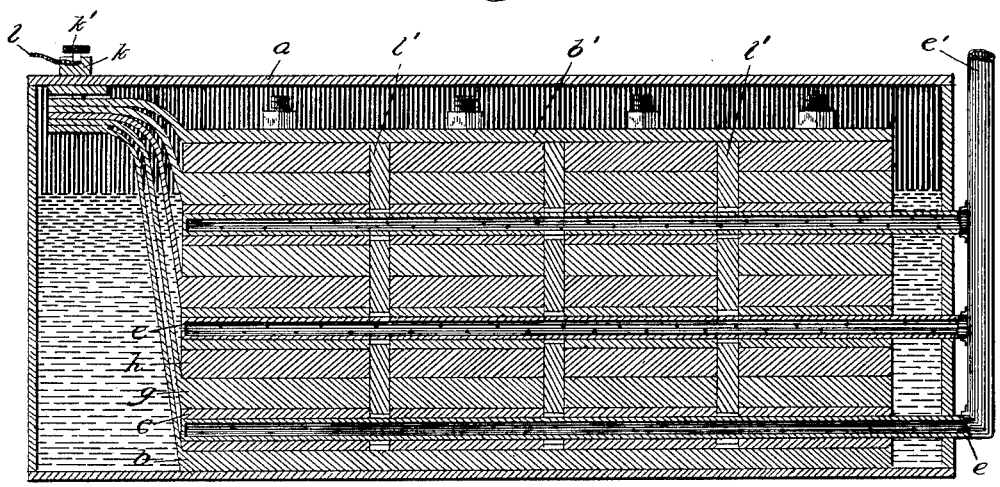
Figure 8:
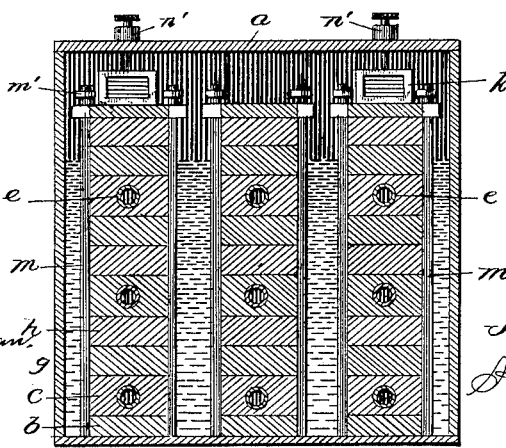

Figure 1 is a perspective view with the cover removed and the casing partly broken away to show the arrangement of the different layers of plates and connections with the saddles. Fig. 2 is a perspective view of the saddle. Fig. 3 is a side view of one of the stay-bolts, partly broken away and showing a portion of the casing. Fig. 4 is a perspective view of the perforated portion of one of the feed-pipes. Fig. 5 is a perspective view of one of the dividing-plates. Fig. 6 is a perspective view of the battery. Fig. 7 is a longitudinal sectional view of the same. Fig. 8 is a transverse vertical sectional view.

I first provide a casing $a$, which is composed of hard rubber or other suitable insulating material, and arranged on the bottom of this casing are a series of plates $b$, which are also composed of hard rubber or other suitable insulating material. On top of these plates $b$ and in engagement with the same are placed the asbestos plates $c$, provided with an aperture $d$, extending in alinement with the plate to receive the metallic pipes $e$, which serves both as a feed-pipe and a conductor of the current from one cell to another, the portion of which extending through the asbestos plates is provided with a series of perforations $f$, these feed-pipes being preferably composed of aluminium, though other suitable material may be employed. On top of the asbestos plates is placed an aluminium plate $g$, and on top of the aluminium plate $g$ is placed an oxid plate $h$, the layers being carried out in this order to any extent desired, the top or upper plate $b'$ of each series being preferably composed of hard rubber. This top plate $b'$, the base-plate $b$, and each of the aluminium and rubber plates are provided with an extension end which engages in a saddle $k$, provided with a binding-post $k'$ to receive the wire $l$ of the negative current.

The series of asbestos, aluminium, and oxid plates above the hard-rubber plate $b$ are formed in sections and divided by means of vertically-arranged hard-rubber plates $l'$, or these plates may be composed of any material performing the same purpose as the hard rubber, said plates being provided with apertures $l^2$ to receive the perforated ends of the feed-pipes extending through the asbestos plates. The plates are held in contact with each other by means of stay or fastening bolts $m$, extending through the bottom of the casing $a$ and through overhanging portions $b^2$ of the plate $b'$, where they are secured by nuts $m'$ or other suitable means, and arranged between these nuts $m'$ and the plate $b'$ are springs $n$ to compensate for the expansion of the asbestos plates.

In the illustration of the battery given in Fig. 1 I have shown three series of these plates and by means of the dividing-plates $l'$ forming twelve cells, though any number of these cells may be arranged that may be desired, and the connections to the saddles are all the same, so that the same reference-letters have been employed, the end of the battery having two saddles when three series of plates are provided, carrying binding-posts $n'$ to receive the wires $o\ o$ from the positive electrode. The feed-pipes $e\ e$ are provided at their outer ends with vertically-extending portions $e'$, communicating with each feed-pipe $e$ to feed the solution thereto, these being arranged at each end of the battery, as is required by the number of series of plates.

By the construction of the series of plates of oxid, asbestos, and aluminium and the perforated pipes passing through the asbestos plates it will be seen that the solution passing through the feed-pipes will circulate from the perforated ends of same into the asbestos plates and into contact with the active material, thereby increasing the efficiency of the same, and the expansion and contraction caused by the asbestos plates is compensated for in the springs arranged between the upper plate and the nuts of the securing stays or bolts. This expansion and contraction is also compensated for by means of the curved extension ends of the plates engaging in the saddles, as by this construction the same will be prevented from breaking through the expansion.

As previously stated herein, I do not wish to limit myself to any number of the plates that may be thus placed in series, as it will be observed that any number of cells desired may thus be provided, and also that various other changes may be made in the details of construction without departing from the general spirit of my invention.

Having fully described my invention, what I claim as new, and desire to secure by Letters Patent, is—

1. In a storage battery, the combination of the series of electrodes arranged horizontally within said casing, a vertically-arranged insulating-plate in the casing dividing said series into cells, a metallic perforated feed-pipe connecting said cells and forming a path for the current from one cell to the other and suitable connection between said electrodes and the binding-post carried by the casing substantially as described.

2. In a storage battery consisting of a casing, a series of plates of rubber, asbestos, aluminium and active material arranged horizontally within said casing, a vertically-arranged insulating-plate dividing said series into cells, a metallic perforated feed-pipe passing through the asbestos and forming a path for the current from one cell to another, and connections between said aluminium plates and binding-post carried by said casing.

In testimony whereof I affix my signature in presence of two witnesses.

JOHN D. RIVELY.

Witnesses:
A. M. WILSON,
THOS. M. BOYD, Jr.